(No Model.)
W. J. N. WELBORN.
ATTACHMENT FOR PLOWS.
No. 263,637. Patented Aug. 29, 1882.
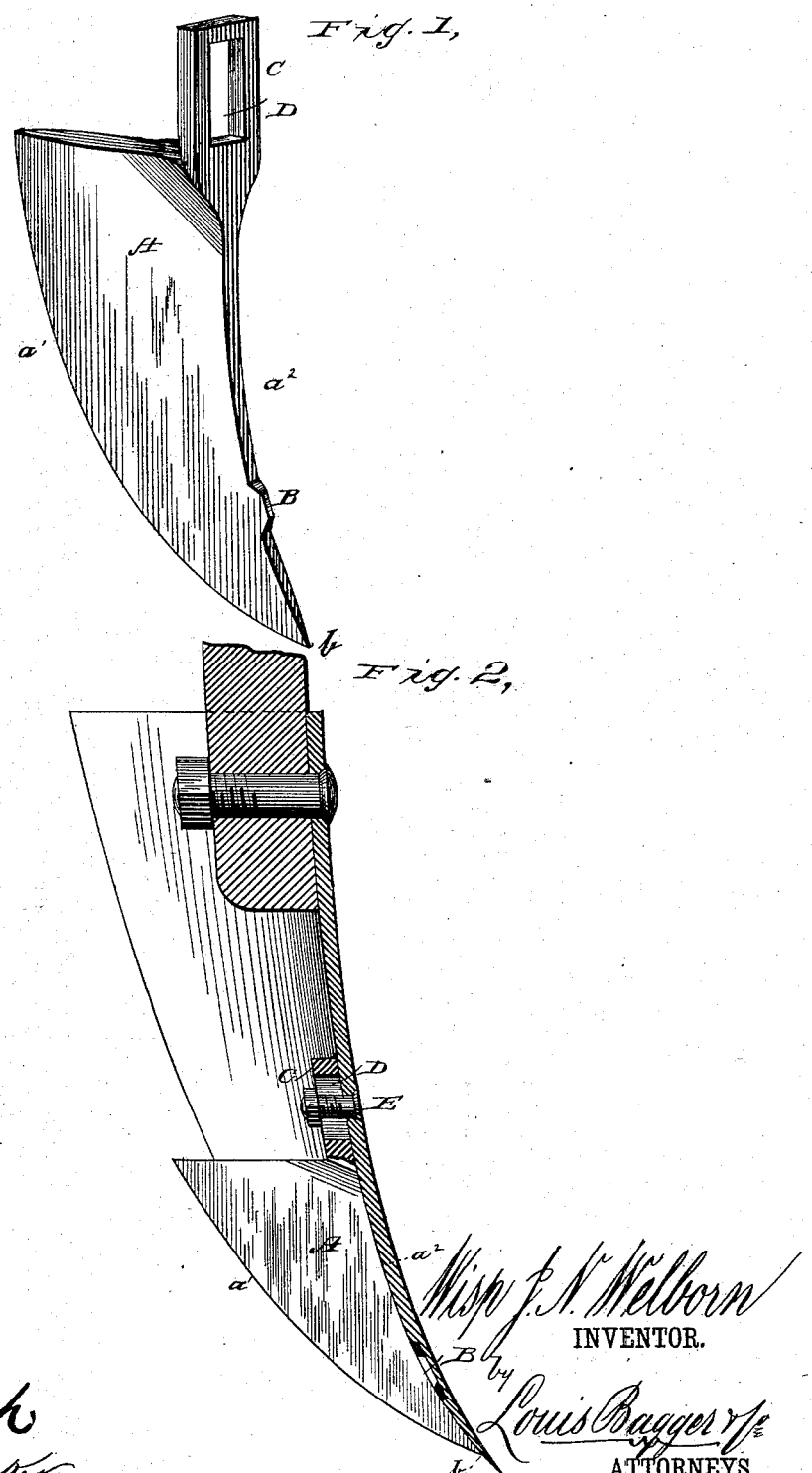

UNITED STATES PATENT OFFICE.

WISP J. N. WELBORN, OF COTTONDALE, TEXAS.

ATTACHMENT FOR PLOWS.

SPECIFICATION forming part of Letters Patent No. 263,637, dated August 29, 1882.

Application filed June 26, 1882. (No model.)

*To all whom it may concern:*

Be it known that I, WISP J. N. WELBORN, of Cottondale, in the county of Wise and State of Texas, have invented certain new and useful Improvements in Attachments for Plows; and I do hereby declare that the following is a full, clear, and exact description of the invention, which will enable others skilled in the art to which it appertains to make and use the same, reference being had to the accompanying drawings, which form a part of this specification.

My invention has relation to devices for guiding or directing shovel-plows, sweeps, or cultivator-plows, and thus release in a great measure the strain upon the arms of the plowman consequent upon directing the plow in its proper course; and it consists in the detailed construction of a device or attachment of that class, as hereinafter more fully described, and particularly pointed out in the claim.

In the accompanying drawings, Figure 1 represents a perspective view, showing the guide-runner; and Fig. 2, a side elevation, broken away to show means of attachment.

By reference to the accompanying drawings, which form a part of this specification, and in which similar letters of reference indicate like parts, A represents the blade or body of the device, having a convex or rounded sharpened edge, $a'$, and the upper edge or back $a^2$ is slightly concaved and forms a point at $b$ by its connection with a line representing the oval edge $a'$, and a proper distance from the point $b$ there is formed a projection, B, which is adapted to reciprocate with a slot on the under side of the plow; and C represents a projecting flange having an elongated slot, D, formed for the purpose of securing the device to a plow by a bolt and nut, E, the said slot D allowing it to be moved backward as the plow becomes worn.

The operation of my invention is obvious. When the device is properly attached to a shovel-plow, cultivator-plow, or sweep, by simply bearing upon the handles either right or left, as required, by the plowman the device is guided in the direction desired; or, by means of the knife-shaped blade running beneath the shovel of the plow, it may be kept in a straight line.

I am aware that plows have been constructed with a hinged or pivoted sector operating as an adjustable guide, as shown in the Letters Patent No. 123,858 to U. Billups, dated February 20, 1872; nor do I claim broadly the combination with a plow of a guiding attachment. But the advantage of my device over others of the same class with which I am acquainted is its simplicity of construction and the facility of its application, making it strong and durable, as well as inexpensive and applicable to all kinds of plows. Hence,

What I claim, and desire to secure by Letters Patent of the United States, is—

The herein-described guiding attachment for plows, consisting of the blade or runner A, having convex edge $a'$, concave edge $a^2$, point $b$, offset B, and slotted seat or projection C at right angles to the blade, substantially as and for the purpose set forth.

In testimony that I claim the foregoing as my own I have hereunto affixed my signature in presence of two witnesses.

WISP J. N. WELBORN.

Witnesses:
T. L. TAYLOR,
W. J. MANN.